United States Patent

Hayashi

Patent Number: 5,851,322
Date of Patent: Dec. 22, 1998

[54] PNEUMATIC TIRE INCLUDING GROOVE AND SIPE EXTENDING ALONG PARABOLA

[75] Inventor: Motoo Hayashi, Akashi, Japan

[73] Assignee: Sumitomo Rubber Industries, Ltd., Hyogo-Ken, Japan

[21] Appl. No.: 774,640

[22] Filed: Dec. 30, 1996

[30] Foreign Application Priority Data

Jan. 30, 1996 [JP] Japan .................................. 8-014460

[51] Int. Cl.⁶ .......................... B60C 11/03; B60C 11/12; B60C 115/00

[52] U.S. Cl. ................. 152/209 R; 152/209 D; 152/DIG. 3

[58] Field of Search .......................... 152/209 R, 209 D, 152/DIG. 3

[56] References Cited

U.S. PATENT DOCUMENTS

| | | | |
|---|---|---|---|
| D. 344,697 | 3/1994 | Christie | D12/147 |
| 4,057,089 | 11/1977 | Johannsen | 152/209 R |
| 4,424,843 | 1/1984 | Fontaine et al. | 152/209 R |
| 4,424,844 | 1/1984 | Fontaine | 152/209 R |
| 4,424,845 | 1/1984 | Baus et al. | 152/209 R |
| 4,865,098 | 9/1989 | Majerus | 152/209 R |

FOREIGN PATENT DOCUMENTS

| | | |
|---|---|---|
| 0089306 | 9/1983 | European Pat. Off. . |
| 0375596 | 6/1990 | European Pat. Off. . |
| 8524494 | 10/1985 | Germany . |
| 4239475 | 5/1994 | Germany . |
| 3-10908 | 1/1991 | Japan .................... 152/209 R |
| 5-69706 | 3/1993 | Japan .................... 152/209 D |
| 5-178023 | 7/1993 | Japan .................... 152/209 D |
| 1499365 | 2/1978 | United Kingdom . |

OTHER PUBLICATIONS

Abstract for German 4239475.

*Primary Examiner*—Steven D. Maki
*Attorney, Agent, or Firm*—Birch, Stewart, Kolasch & Birch, LLP

[57] ABSTRACT

A pneumatic tire comprises a tread portion provided with a pair of circumferential grooves and axial grooves extending from the circumferential grooves to tread edges, each of the axial grooves extending along a parabola of which the parabola axis extends parallel to the tire axial direction and the parabola vertex is disposed on the axially outer edge of the circumferential groove and the parabola focus disposed axially outward of the parabola vertex, and the axially outer edge of the axial groove extending on the parabola from the parabola vertex to the tread edge, whereby a flow of water is improved and thus a flow of air is also improved to improve wet performances without increasing tire noise.

6 Claims, 6 Drawing Sheets

Reference

PNEUMATIC TIRE INCLUDING GROOVE AND SIPE EXTENDING ALONG PARABOLA

The present invention relates to a pneumatic tire having an improved tread portion provided with parabolic grooves which can improve wet performances of the tire.

Recently, as the silence of the car mechanism has been remarkably improved, a request to the tires to generate less noise becomes more severe.

On the other hand, in the pneumatic tires, tread patterns which comprises circumferential grooves and axial grooves to define blocks are widely used, expecting good wet performances. Hitherto, in order to improve wet performances, usually the number and/or width of the circumferential and axial grooves are increased and the land/sea ratio of the tread is decreased.

Those countermeasures are however liable to increase the so called air pumping sound and air resonance sound. Thus the tire running noise is liable to increase. Hitherto, therefore, it is inevitable to adjust such contradictory wet performances and tire noise by sacrificing one of them.

It is therefore, an object of the present invention to provide a pneumatic tire in which a flow of water is improved and thus a flow of air is also improved to improve the wet performances without increasing the tire noise.

According to one aspect of the present invention, a pneumatic tire comprises a tread portion having a tread face having tread edges, a pair of circumferential grooves each disposed on each side of the tire equator and near the tire equator and extending continuously in the circumferential direction of the tire so as to define a central part between the circumferential grooves and a pair of axially outer parts axially outward of the circumferential grooves, and axial grooves disposed in each of the axially outer parts at pitches P in the tire circumferential direction, wherein each of the axial grooves extends from one of the circumferential grooves to one of the tread edges along a parabola, the parabola having the vertex disposed on the axially outer edge of the circumferential groove, and the parabola axis extending parallel to the tire axial direction, and the parabola focus disposed axially outward of the parabola vertex, and the axial groove having an axially outer edge extending on the parabola from the parabola vertex to the tread edge.

Accordingly, a flow of water along the parabola from the circumferential groove to the axial grooves or from the axial grooves to the circumferential groove becomes very smooth and thus drainage is effectively improved to improve wet performances.

Further, a flow of air is also smooth and tire noise especially pumping noise is effectively decreased, and as a result resonance noise is also decreased.

Furthermore, as the groove edges are curved along a parabola, the edges are prevented from simultaneously contacting with the ground, and as a result the so called impact sound is decreased, which also reduces the tire noise.

Embodiments of the present invention will now be described in detail in conjunction with the accompanying drawings.

FIG. 1 shows a pneumatic tire 1 according to the invention which is a low aspect ratio radial tire for passenger cars, and an example of the internal tire structure is shown.

Figure 1:
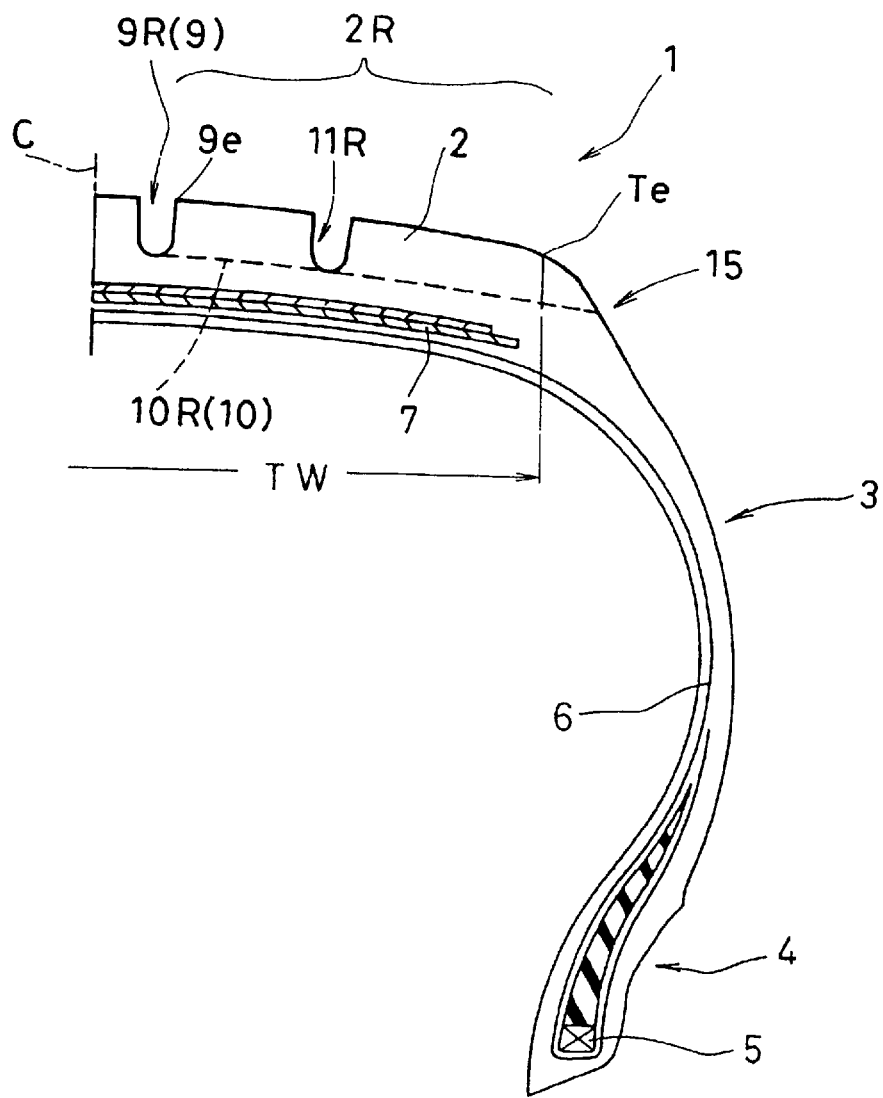
FIG. 1 is a cross sectional view of an embodiment of the present invention.

The tire 1 comprises a tread portion 2, a pair of sidewall portions 3, a pair of axially spaced bead portions 4 each provided with a bead core 5 therein, a radial carcass 6 extending between the bead portions 4 through the tread portion 2 and sidewall portions 3 and turned up around the bead cores 5 to be secured thereto, and a stiff belt 7 disposed, as a hoop, radially outside the carcass 6 and inside the tread portion 2.

In the tread portion 2, a pair of circumferential grooves 9L and 9R (generically 9) and axial grooves 10L and 10R (generically 10) are disposed to form novel tread patterns shown in FIGS. 2–5.

The circumferential grooves 9L and 9R are each disposed on each side (left side and right side) of the tire equator C and near the tire equator C, and extend continuously in the circumferential direction of the tire so as to define a central part of the tread between the circumferential grooves 9L and 9R and a pair of axially outer parts 2L and 2R (generically 2) of the tread each extending from the axially outer edge 9e of one of the circumferential grooves 9L, 9R to one of tread edges Te.

The axial grooves 10L and 10R are arranged circumferentially at regular or irregular pitches and connected with the circumferential grooves 9L and 9R, respectively. Each axial groove 10 extends along a parabola 12 from one of the circumferential grooves 9 beyond one of the tread edges Te so that the axially inner end is opened to the circumferential groove 9 and the axially outer end is opened in a buttress portion 15.

Here, the tread edges Te is defined as the axial outermost edges of the ground contacting region of the tread portion 2 under such a condition that the tire is mounted on a standard rim, and inflated to a normal pressure and then loaded with 80% of the maximum load. The standard rim is a rim officially approved for the tire by, for example JATMA (Japan), TRA (USA), ETRTO (Europe) and the like, and the normal pressure and maximum air pressure are officially specified by the same associations. The tread width TW is defined between the tread edges Te.

Figure 3:
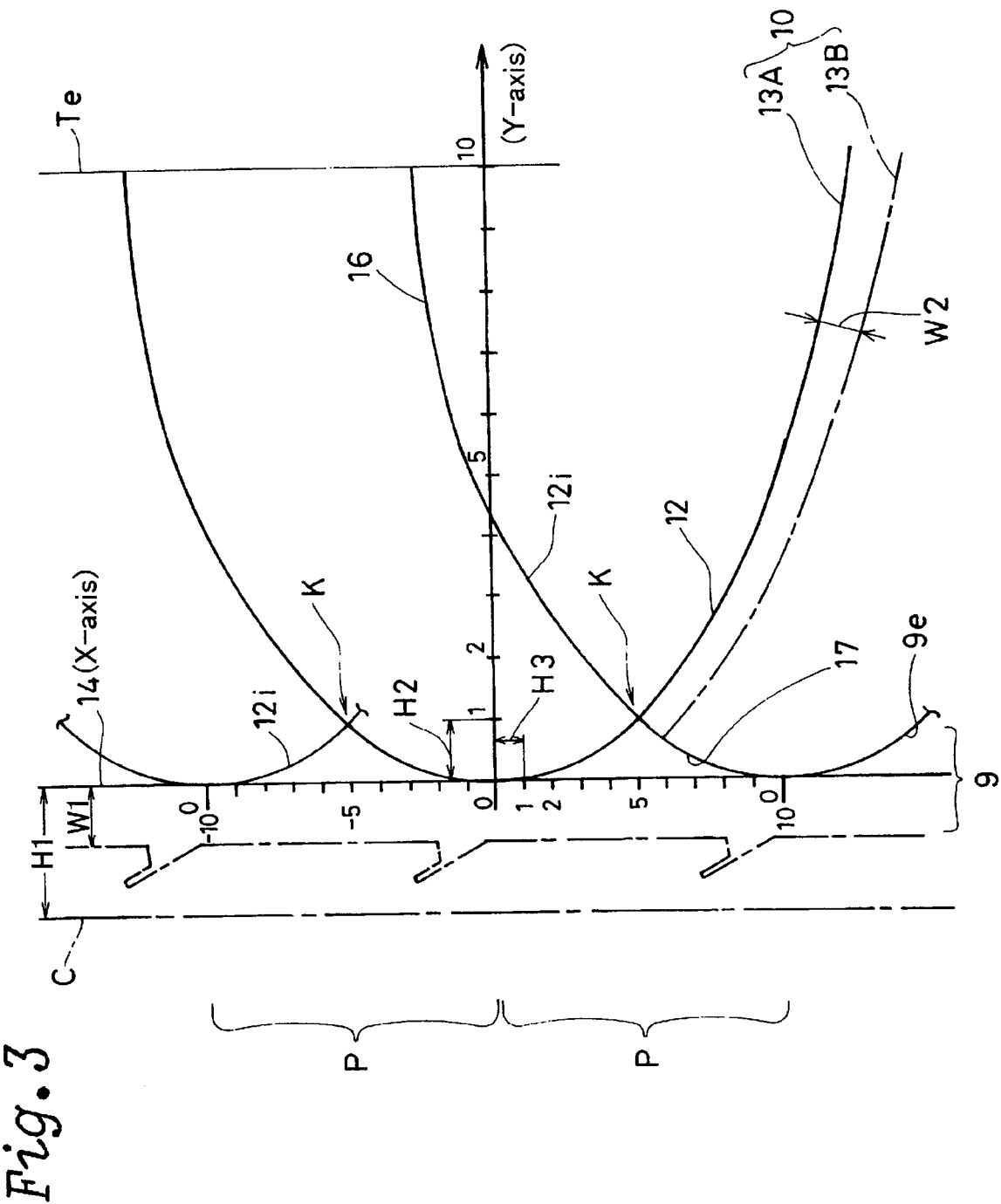
FIG. 3 is a diagram for explaining the parabola and axial grooves.

As shown in FIG. 3, a parabola 12 is described according to an equation $$Y = A \cdot X^2$$

where

A is a constant value in the range of from 0.030 to 0.060.
This equation is expressed, based on X-Y coordinates in which X-axis extends parallel with the tire circumferential direction, Y-axis extends parallel with the tire axial direction, the origin O is set at a small axial distance H1 from the tire equator C, a unit length H2 in Y-axis is equal to one tenth of the axial distance between the origin O and tread edge Te, a unit length H3 in X-axis is equal to one tenth of a pitch P.

Accordingly, the parabola vertex is at the origin O, and the parabola axis extends parallel to the tire axial direction, and the direction of the parabola is such that the focus is axially outside the origin O.

Figure 2:
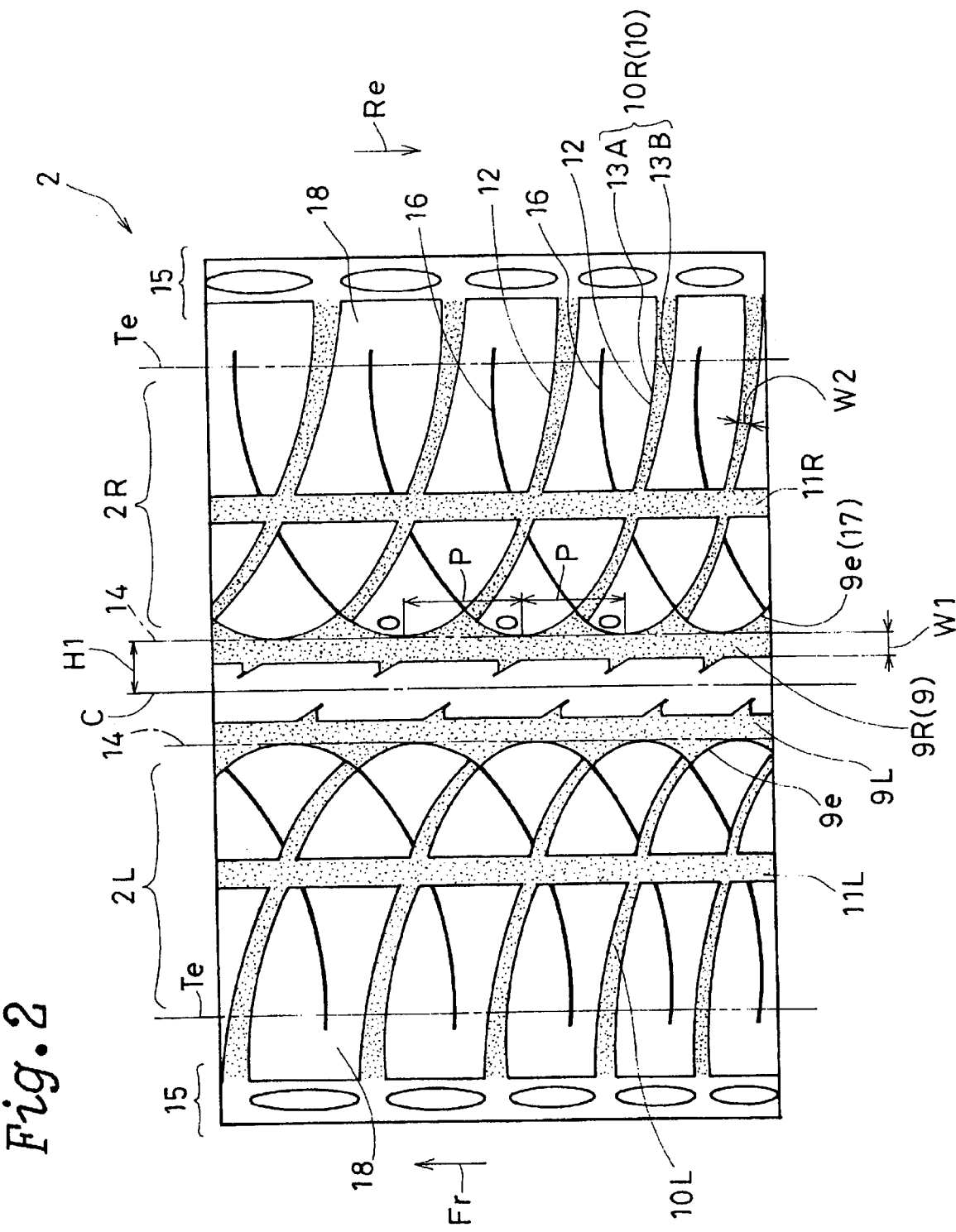
FIG. 2 is a developed view showing an example of the tread pattern thereof.

As shown in FIGS. 2 and 3, a plurality of parabolas 12 are described on each side of the tire equator C, setting the origins O thereof on a circumferential line 14 at pitches P.

As the pitches P, it is possible to use regular pitches or variable pitches. In case of variable pitches, accordingly, the above-mentioned unit length H3 on one side of a parabola axis may be differed from the other side. Accordingly, a parabola 12 always intersects the circumferentially adjacent parabolas 12 at points K which are (+5, 25A) and (−5, 25A).

In this specification, the pitches of the axial grooves 10 are defined by the pitches P. Preferably, the number of pitches P per circumference is in the range of from 40 to 80 in case of passenger car tires.

A part of the tread which extends axially inwardly from the above-mentioned circumferential straight line 14 by an axial distance W1 is engraved as the circumferential groove 9.

Further, a generally triangular part (O-K-O) surrounded by the circumferential straight line 14 and two adjacent parabolas 12 is engraved as a flaring junction part 17 between the circumferential groove 9 and axial groove 19. No step difference is formed in the depth of the channel from the circumferential groove 9 to the axial groove 10 through the flaring junction part 17, but a gradual change may be possible.

Therefore, a plurality of flaring junction parts 17 are formed repeatedly in the tire circumferential direction along the axially outside of the circumferential groove 9. Thus, the circumferential groove 9 is regarded as having an axially outer edge which has a wavy configuration. On the other hand, the axially inner edge of the circumferential groove 9 preferably has a generally straight configuration.

In this example, therefore, the central part of the tread is formed as a circumferentially continuously extending straight rib. In order to further provide edge effect, it is possible to dispose small size sipes, cuts and the like in this rib, which are for example extending from the edges of the rib towards the tire equator but terminate before the equator as shown in the figures.

The axial distance HI from the tire equator C to the line 14 is set in the range of from 0.05 to 0.20 times the tread width TW.

The axial distance W1 is set in the range of from 0.03 to 0.10 times the tread width TW.

With respect to each of the parabolas 12, one axial groove 10 is formed on one side of the parabola axis, and on the other side of the parabola axis one sipe 16 is formed along the parabola. Further, on each side of the tire equator C, the axial grooves 10 are formed on the same side of the parabola axes. Here, the sipe is a cut or narrow groove having a width of from 0 to 2 mm.

As a result, the blocks 18 defined between the axial grooves 10 increase the pattern rigidity in the tire axial direction to increase the cornering force and thus cornering performance in dry conditions can be improved.

On the other hand, the sipes 16 can display their edge effect to improve wet performance especially wet road grip without decreasing the pattern rigidity.

Preferably, the axially outer end of each sipe 16 is terminated in the block 18 to maintain the pattern rigidity at a high level.

Each of the axial grooves 10 is formed on the other side of the parabola 12 than the same side as the focus, placing an axially outer groove wall 13A on the parabola 12 and an axially inner groove wall 13B extending substantially parallel thereto on the outside of the parabola. Accordingly, a convexly curved groove edge or groove wall which extends from a parabola vertex to the tread edge is formed.

The groove width W2 of the axial grooves 10 is set to be not more than the axial distance W1 but more than the width of the sipe.

In the example shown in FIG. 2, the axial grooves 10R on one (right) side of the tire equator C are formed on the lower side Re of the parabola axes, but the axial grooves 10L on the other (left) side are formed on the upper side Fr to form a tread pattern which is substantially a point symmetry.

Further, the tread portion 2 in this example is provided with two circumferential grooves 11L and 11R each disposed in the middle of each of the axially outer parts 2L and 2R and extending continuously in the tire circumferential direction in addition to the above-mentioned pair of circumferential grooves 9L and 9R.

Figure 4:
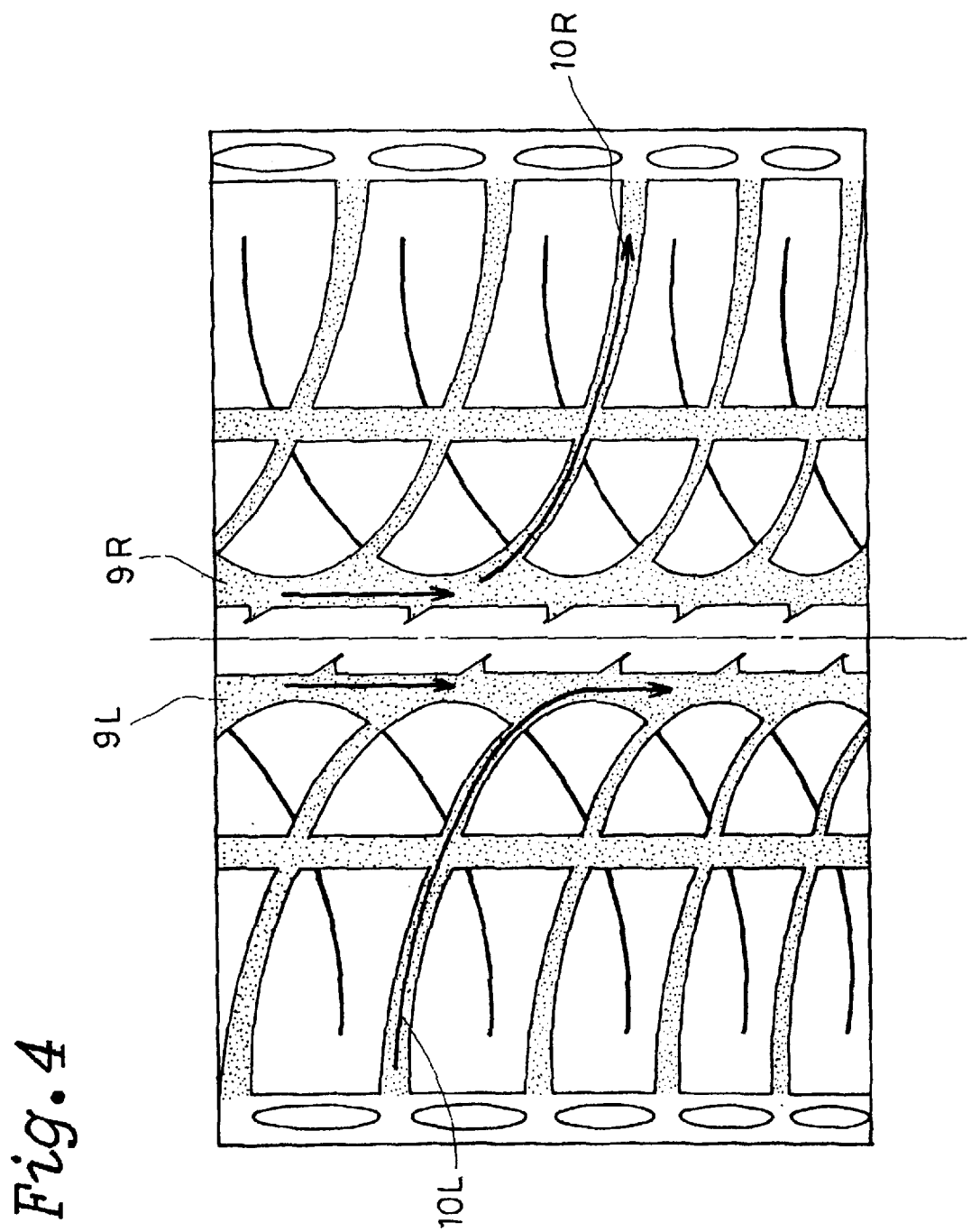
FIG. 4 shows a flow of water in the above-mentioned tread pattern.

Accordingly, as shown in FIG. 4. due to the existence of the flaring parts 17, a flow of water along the parabola 12 from the circumferential groove 9R to the axial grooves 10R and also from the axial grooves 10L to the circumferential groove 9L becomes very smooth and thus drainage is effectively improved.

Further, as the axial groove 10 is along a parabola 12, there is no inflection point, and the resistance to water flow and air flow is very small.

In case of the point-symmetrical tread pattern shown in FIG. 2, a discharge of water occurs mainly towards one side of the tire as shown in FIG. 4. Therefore, the tires having such a pattern are mounted on a car such that the direction of water discharge is outside of the car. As a result, the water discharged from the front tires towards the inside of the car is decreased, and a burden to the rear tires decreases and the wet performances of the tires as a whole can be improved.

Figure 5:
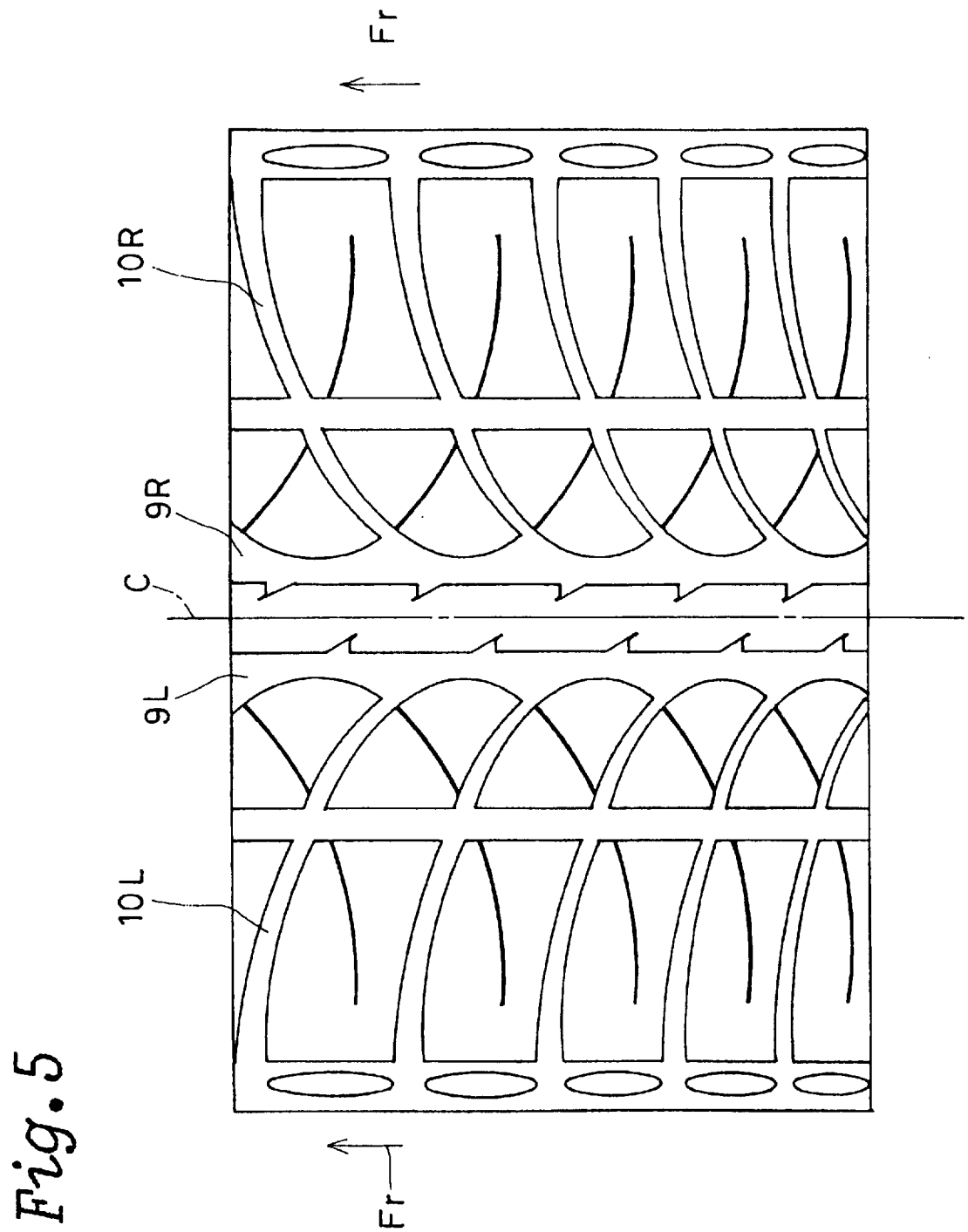
FIG. 5 is a developed view showing another example of the tread pattern.

FIG. 5 shows a modification of the above-mentioned tread pattern, wherein the axial grooves 10R on one (right) side of the tire equator C are formed on the upper side Fr of the parabola axes, and the axial grooves 10L on the other (left) side are also formed on the same upper side Fr, thereby forming a tread pattern which is substantially a line symmetry about the tire equator C, but the pattern is otherwise the same as the former example.

If the above-mentioned constant A in the equation is less than 0.030, the flare of the flaring parts 17 decreases, and the effect of the flaring parts on guiding water from the circumferential grooves 9 to the axial grooves 10 becomes insufficient. Further, the corners formed between the axial grooves and the circumferential groove are liable to be torn off.

On the other hand, if the constant A is more than 0.060, the intersecting angle of the axial groove with the circumferential groove becomes too large, and a smooth flow of water from the axial groove to the circumferential groove can not obtained.

Comparison Tests

Test tires in size of 195/65R15 having the same internal structure shown in FIG. 1 were made and tested for wet performance and noise. Example tire had the tread pattern shown in FIG. 2, but Reference tire had the tread pattern shown in FIG. 6.

Noise test

Using a 2000 cc passenger car provided on all wheels (15X6JJ normal rim) with the test tires (Pressure: front 2.0 kgf/sq.cm, rear 1.9 kgf/sq.cm), the running noise was evaluated by the driver's feeling into ten ranks where 10 to 7 are excellent, 6 average, 5 on the allowable limit, 1 to 4 not allowable.

Wet performance test

Using a 2000 cc passenger car provided on all wheels (15X6JJ normal rim) with the test tires (Pressure: front 2.0 kgf/sq.cm, rear 2.0 kgf/sq.cm), lateral-G was measured as a wet performance. The test car was run in a 100 m radius curved course having a paved road surface provided with a 5 mm depth 20 m long water pool, and the lateral-G was measured in the speed range of from 70 to 90 km/h to calculate the average lateral-G in this speed range. Further, the maximum lateral-G was measured. The larger the value, the better the wet performance.

The results of those tests are as follows.

Figure 6:
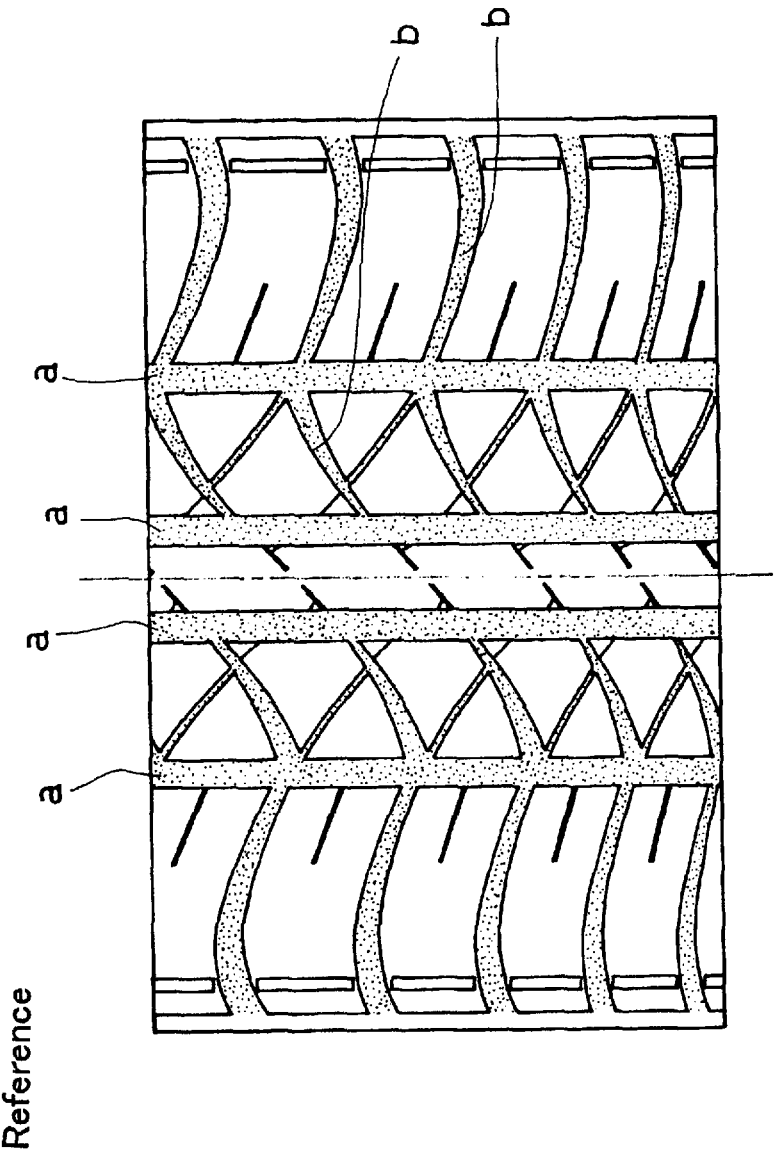
FIG. 6 is a developed view showing a tread pattern used in comparison tests as in the reference tire.

| Tire | Ex. | Ref. |
|---|---|---|
| Tread pattern | FIG. 2 | FIG. 6 |
| Land/sea (%) | 68.8 | 68.4 |
| Noise | | |
| under 30 km/h | 6 | 6 |
| 30 to 60 km/h | 6 | 6 |
| 60 to 90 km/h | 7 | 6 |
| over 90 km/h | 6 | 6 |
| Wet performance | | |
| Maximum lateral G | 0.340 | 0.306 |
| Average lateral G | 0.286 | 0.239 |

Form the tests, it was confirmed that the example tire was superior to the reference tire in wet performance although the noise was improved or maintained at the same level as the reference tire.

I claim:

1. A pneumatic tire comprising a tread portion having a tread face having tread edges, a pair of circumferential grooves each disposed on each side of the tire equator and near the tire equator and extending continuously in the circumferential direction of the tire so as to define a central part between the circumferential grooves and a pair of axially outer parts axially outward of the circumferential grooves, and axial grooves disposed in each of the axially outer parts at pitches in the tire circumferential direction, wherein each of the axial grooves extends from one of the circumferential grooves to one of the tread edges along a parabola, the parabola having the vertex disposed on the axially outer edge of the circumferential groove, and the parabola axis extending parallel to the tire axial direction, and the parabola focus disposed axially outward of the parabola vertex, and with respect to each said parabola, on one side of the parabola axis, an axial groove is disposed to extend along the parabola, but on the other side of the parabola axis, a sipe is disposed to extend along the parabola, the axial groove having an axially outer edge extending on the parabola from the parabola vertex to the tread edge, and generally triangular shaped parts, each triangular shaped part surrounded by circumferentially adjacent parabolas and a circumferential straight line drawn between the parabola vertexes thereof so that the circumferential groove has a wavy axial outer edge whereas the axially inner edge of the circumferential groove is generally straight, and a circumferentially extending rib is defined between the circumferential grooves.

2. The pneumatic tire according to claim 1, wherein each said parabola is described according to an equation $$Y = A \cdot X^2$$

where

A is a constant value in the range of from 0.030 to 0.060, the equation expressed based on X-Y coordinates in which X-axis extends parallel with the tire circumferential direction, Y-axis extends parallel with the tire axial direction, the origin is set at the parabola vertex at a small axial distance H1 from the tire equator, a unit length H2 in Y-axis is equal to one tenth of the axial distance between the origin and tread edge, a unit length H3 in X-axis is equal to one tenth of a pitch P from the origin to a circumferentially adjacent origin.

3. The pneumatic tire according to claim 2, wherein on one side of the tire equator, the axial grooves are each formed on a first side of each of the parabola axes, and on the other side of the tire equator, the axial grooves are each formed on a second side of each of the parabola axes.

4. The pneumatic tire according to claim 2, wherein on one side of the tire equator, the axial grooves are each formed on a first side of each of the parabola axes, and on the other side of the tire equator, the axial grooves are each formed on the same first side of each of the parabola axes.

5. The pneumatic tire according to claim 1, wherein on one side of the tire equator, the axial grooves are each formed on a first side of each of the parabola axes, and on the other side of the tire equator, the axial grooves are each formed on a second side of each of the parabola axes.

6. The pneumatic tire according to claim 1, wherein on one side of the tire equator, the axial grooves are each formed on a first side of each of the parabola axes, and on the other side of the tire equator, the axial grooves are each formed on the same first side of each of the parabola axes.

* * * * *